US011720444B1

(12) United States Patent
Naaman et al.

(10) Patent No.: US 11,720,444 B1
(45) Date of Patent: Aug. 8, 2023

(54) INCREASING OF CACHE RELIABILITY LIFETIME THROUGH DYNAMIC INVALIDATION AND DEACTIVATION OF PROBLEMATIC CACHE LINES

(71) Applicant: Amazon Technologies, Inc., Seattle, WA (US)

(72) Inventors: Ofer Naaman, Hod Hasharon (IL); Osnat Katz, Alone Aba (IL); Nir Bar-Or, Hadera (IL); Adi Habusha, Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/548,190

(22) Filed: Dec. 10, 2021

(51) Int. Cl.
*G06F 11/07* (2006.01)
*G06F 11/10* (2006.01)
*G06F 12/02* (2006.01)
*G06F 12/0891* (2016.01)

(52) U.S. Cl.
CPC ........ *G06F 11/1068* (2013.01); *G06F 11/076* (2013.01); *G06F 11/0772* (2013.01); *G06F 12/0238* (2013.01); *G06F 12/0891* (2013.01)

(58) Field of Classification Search
CPC ...... G06F 3/0619; G06F 3/0631; G06F 3/064; G06F 3/0644; G06F 3/0653; G06F 3/0673; G06F 11/076; G06F 11/0772; G06F 11/1068; G06F 12/0238; G06F 12/0891
USPC ....................................................... 714/764
See application file for complete search history.

(56) References Cited

U.S. PATENT DOCUMENTS

| 6,078,520 A * | 6/2000 | Tobita ................ G06F 12/0866 365/185.11 |
| 6,725,337 B1* | 4/2004 | Tan ..................... G06F 12/0891 711/144 |
| 2007/0011513 A1* | 1/2007 | Biswas ............... G06F 11/1637 714/E11.034 |
| 2010/0011169 A1* | 1/2010 | Pothireddy ......... G06F 12/0862 711/137 |
| 2013/0246868 A1* | 9/2013 | Takagi ................ G06F 11/0763 714/719 |
| 2016/0378591 A1* | 12/2016 | Naeimi .................. G11C 29/52 714/764 |
| 2022/0269645 A1* | 8/2022 | Hillel .................. G06F 13/1657 |

FOREIGN PATENT DOCUMENTS

TW          I420294 B   * 12/2013   .......... G06F 11/1641

\* cited by examiner

*Primary Examiner* — Albert Decady
*Assistant Examiner* — Enam Ahmed
(74) *Attorney, Agent, or Firm* — Klarquist Sparkman, LLP (57) ABSTRACT

A system captures errors and stores an obsolete line bit qualifier per cache entry that can be used to dynamically mark a specific cache entry as obsolete. For example, the cache entry can be marked as obsolete after detecting repetitive single-bit errors on a same cache entry within a predetermined period of time. For cache lines marked as obsolete, a cache controller can ensure that the cache line entry remains unused. The detection of a repetitive single-bit error can be accomplished by implementing a counter per cache entry and a timer. The counter counts errors within a timer window, and a repetitive error is reported if the counter reaches a threshold level. By catching repetitive single-bit errors before such errors spread to multi-bit errors, the system can increase the life span of the server computer.

18 Claims, 7 Drawing Sheets

INCREASING OF CACHE RELIABILITY LIFETIME THROUGH DYNAMIC INVALIDATION AND DEACTIVATION OF PROBLEMATIC CACHE LINES

BACKGROUND

In recent years, processors in server computers are becoming denser with an increased core count that contain hundreds of megabytes of on-die caches. With increased cache density, the probability for errors for cache memory increases. For this reason, modern caches integrate error detection and correction hardware to alleviate some of the errors. While some errors are correctable, others are not. For example, the error correction hardware might be able to fix one flipped bit of a cache line, but once two or more bits become flipped, the cache line might become uncorrectable.

DETAILED DESCRIPTION

Cache lines that have a high frequency of errors for a single bit (which is correctable) can digress to multiple bit errors in a same cache line (which is uncorrectable). Once enough cache lines have uncorrectable errors, the integrity of the cache memory declines and elevated corrective action can result in a disruption to service. A system, described herein, captures errors and stores an obsolete line bit qualifier per cache entry that can be used to dynamically mark a specific cache entry as obsolete. For example, the cache entry can be marked as obsolete after detecting repetitive single-bit errors on a same cache entry within a predetermined time period. For cache lines marked as obsolete, a cache controller can ensure that the cache line entry remains unused. The detection of a repetitive single-bit error can be done by implementing a counter per cache entry and a timer. The counter counts errors within a timer window, and a repetitive error is reported if the counter reaches a threshold level. By catching repetitive single-bit errors before such errors spread to multi-bit errors, the system can increase the life span of the server computer by reducing a number of uncorrectable errors that occur because excessive uncorrectable errors can result in a corresponding server computer to be taken off-line. Additionally, making the repeating single-bit error threshold programmable, and a maximum number of obsolete cache entries (N) programmable, allows a cloud operator to balance between server life time and performance impact.

Figure 1:
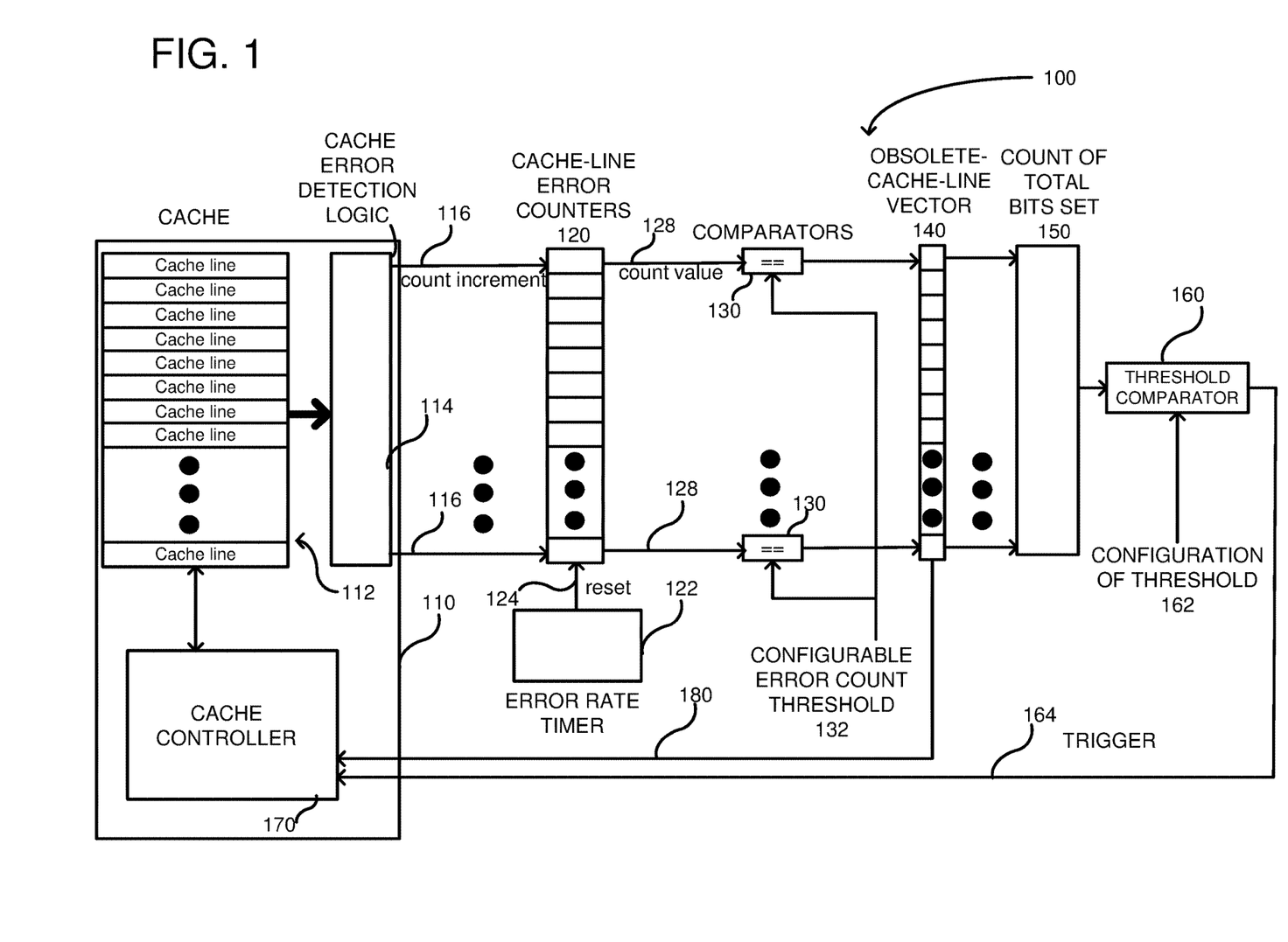
FIG. 1 is a system for cache memory error detection according to one embodiment including an obsolete cache-line vector.

FIG. 1 is a diagram of a system 100 for detecting cache memory errors. The system 100 includes a cache memory 110 including a plurality of cache memory lines, shown generally at 112. The cache memory 110 also includes error detection logic 114. The error detection logic 114 outputs a plurality of error signal lines 116, wherein each error signal line corresponds to one cache line 112. When an error is detected on a cache line 112 by the error detection logic 114, the corresponding output on the error signal lines 116 is activated as a transitory pulse. The transitory pulse is input into a plurality of counters 120. The plurality of counters 120 includes one counter per error signal line 116, and, correspondingly, one counter per cache line 112. When one of the error signal lines 116 is activated with the transitory pulse, the corresponding counter 120 is incremented. An error rate timer 122 outputs a reset signal 124 after a periodic time period (e.g., 1 day), which results in the counters 120 being reset. The error rate timer 122 can be configurable (e.g., through an API) to change a time window for monitoring a frequency of events from the cache error detection logic 114. An output from each of the plurality of counters 120 is a counter value 128. The counter value 128 is input into a plurality of comparators 130, wherein each comparator is associated with one of the counters 120. The comparators 130 determine when the count value 128 reaches a threshold amount 132, which is configurable (e.g., through an API). Once the comparator 130 is triggered, it outputs a clock edge, which is captured in an obsolete cache-line vector 140. As further described below, the obsolete cache line vector 140 includes a plurality of memory elements and captures a transition of an output of the comparators 130. In particular, the plurality of memory elements of the obsolete cache-line vector 140 is coupled in parallel with the comparators 130. Once set, the corresponding memory element of the cache line vector 140 remains set or locked until reset. A counter 150 (also called a vector counter) is coupled to each of the memory elements of the obsolete cache line vector 140 and computes the total number of memory elements that are set. Thus, the counter 150 counts how many of cache lines 112 have had a plurality of errors equal to the threshold of the comparators 130. A threshold comparator 160 is coupled to the counter 150 and receives a configuration input 162 (e.g., through an API), which adjusts when the threshold comparator is triggered. When the counter 150 reaches the predetermined threshold, as set by the configuration 162, then the threshold comparator 160 outputs a trigger signal 164. The trigger signal 164 can, in turn, be received by a cache controller 170, which can invalidate and deactivate failing cache lines in response to the trigger signal 164. The cache controller 170 can update a main memory for dirty cache lines that are being invalidated or deactivated. Even when the failing cache line is not dirty, the cache controller 170 can send an update message to a system, in which the cache controller resides, indicating that it is no longer an owner of the cache line. The cache controller 170 can also read the obsolete cache-line vector 140 so that it can determine which cache lines are problematic. Thus, the cache controller 170 can determine which cache lines 112 have a threshold (132) number of repeated errors within a time window as defined by timer 122. The cache controller 170 can then ensure that such cache lines are not used (e.g., invalidate and/or deactivate) so that the cache lines do not regress to an uncorrectable error condition.

Figure 2:
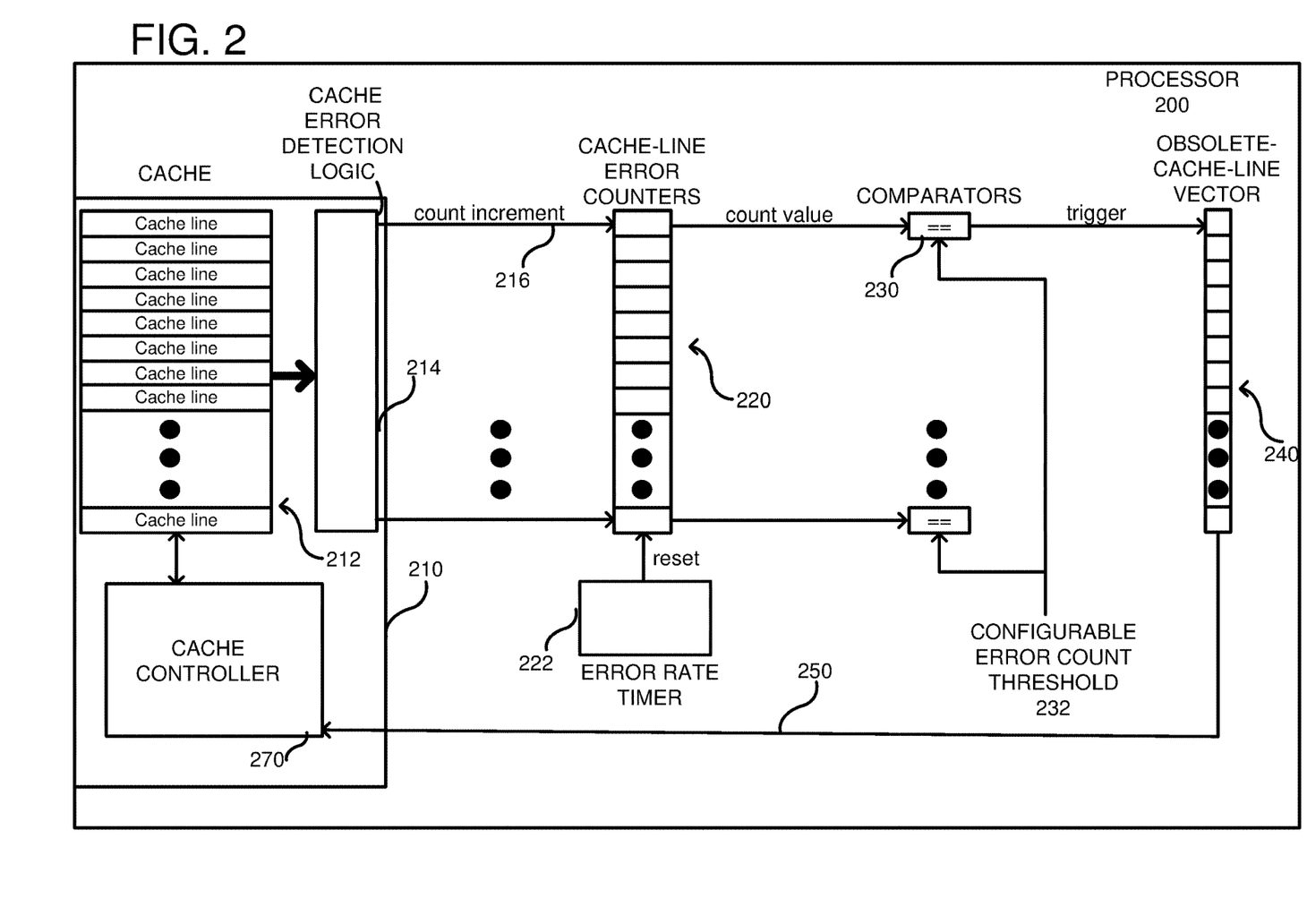
FIG. 2 is a system for cache memory error detection according to another embodiment including the obsolete cache-line vector.

FIG. 2 shows another embodiment of a processor 200 including a cache memory 210, cache lines 212, error detection logic 214, and a cache controller 270 similar to that described in relation to FIG. 1. However, in this embodiment, feedback is provided to a cache controller 270 directly from the obsolete cache line vector 240. Additionally, the error detection logic 214 has output lines 216 that can be set when an error occurs in one of the cache lines 212. The number of output lines 216 can equal the number of cache lines 212 so that any error on a cache line can trigger one of the corresponding output lines 216 to be pulsed. A plurality of counters 220 are coupled on a one-to-one basis with the output lines 216 so that there is one counter per cache line. Each error associated with a cache line 212 detected by the error detection logic 214 results in a corresponding counter 220 being incremented. At a predetermined frequency, the counters 220 are reset by an error rate timer 222, which controls a frequency of errors being monitored. For example, errors that are infrequent (e.g., once per month) are not captured because the timer 222 clears out such errors. A typical timer setting can be once per day or once per week. A plurality of comparators 230 are coupled to the counters 220 on a one-to-one basis. Once any of the counters 220 reach a predetermined value, a corresponding comparator 230 is triggered resulting in a switching of state of a comparator output. The predetermined value at which the comparators 230 are triggered is controlled by a configuration input 232. An obsolete cache line vector 240 includes a plurality of memory elements coupled to the comparators 230 on a one-to-one basis. Consequently, there is one memory element corresponding to each cache line 212. Whenever one of the comparator output lines are triggered, the corresponding memory element of the obsolete cache line vector 240 can capture that the threshold for that comparator was reached. The cache management controller 270 is coupled to the obsolete cache line vector 240 and can monitor if any of the memory elements are activated. If so, the cache management controller 270 can take corrective action on the cache memory 210, such as by ensuring some of the problematic cache lines are no longer used. The corrective action can further include writing dirty cache lines back to main memory and notifying a system that the cache management controller 270 is no longer an owner of the failing cache line. Although the embodiment relates to the processor 200, the components can be included in a different type of integrated circuit.

Figure 3:
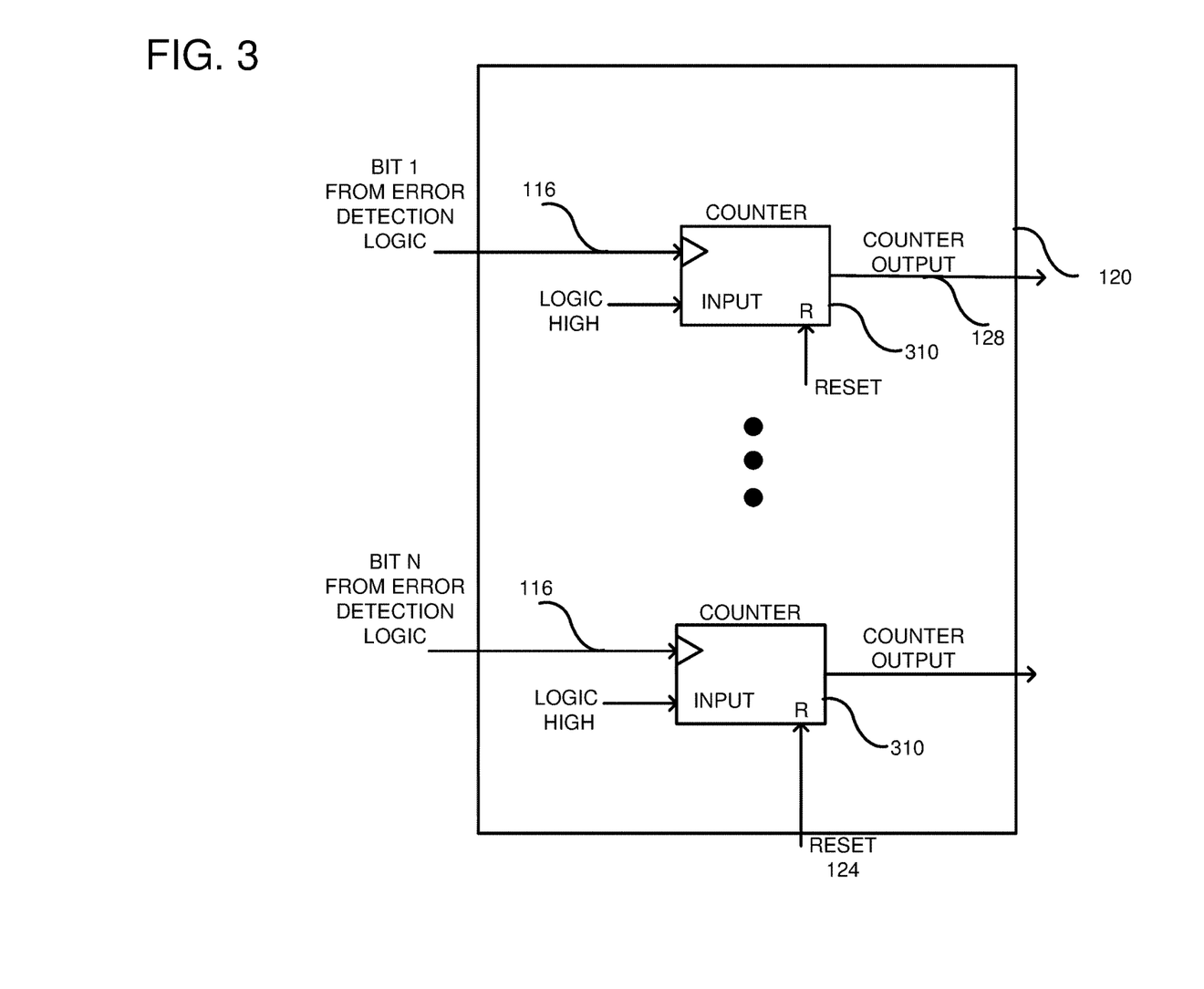
FIG. 3 shows a detailed view of a counter used in FIGS. 1 and 2.

FIG. 3 shows further details of the counters 120 (FIG. 1)(which can also be used for counters 220 (FIG. 2)). In this embodiment, the counters 120 can include N individual counters 310, where N equals any integer value and corresponds to a number of outputs of the error detection logic 114 (FIG. 1). The counters 310 are shown as having a logic high coupled to the input and the outputs 116 from the error detection logic 114 coupled to a clock input. When any one of the input bits from the error detection logic transitions from a low to a high logic value, the corresponding counter increments. A reset line 124 can be used to reset all of the counters 310 simultaneously. The reset line 124 is coupled to the error rate time 122. The counter output 128 is a multi-bit output including a value of the counter.

Figure 4:
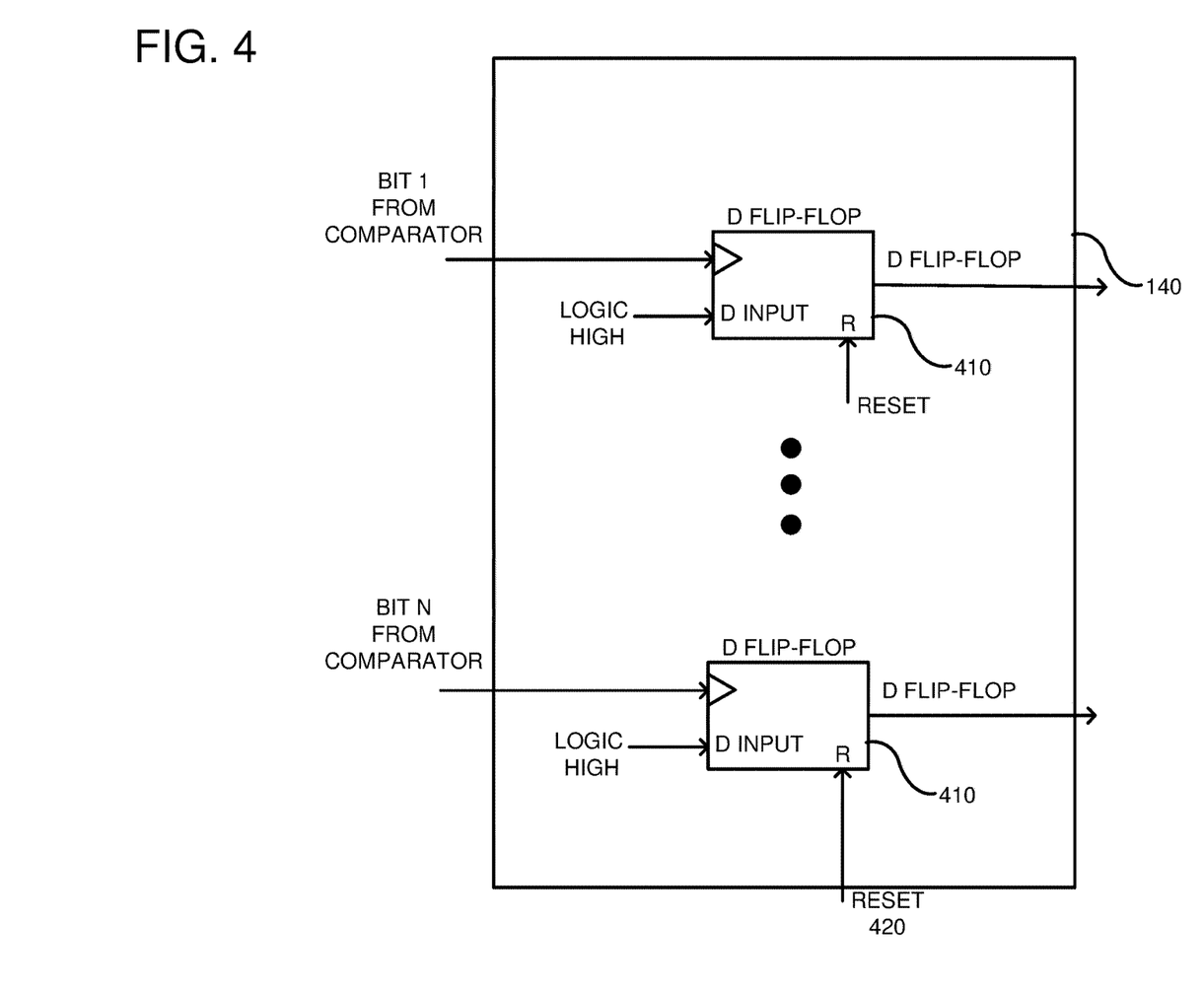
FIG. 4 shows a detailed view of the obsolete cache-line vector of FIGS. 1 and 2.

FIG. 4 shows further details of the obsolete cache line vector 140 (FIG. 1)(which can also be used for the obsolete cache line vector 240 (FIG. 2)). In this embodiment, the obsolete cache line vector 140 can include N flip-flops 410, where N equals any integer value and corresponds to a number of outputs of the comparators 130 (FIG. 1). The flip-flops 410 are shown as D-type flip-flops with a logic high coupled to the D input and the inputs from the comparators 130 coupled to a clock input. When any one of the input bits from the comparators 130 transitions from a low to a high logic value, the D flip-flop latches the D input, which captures a logic high. Thus, a transition on the input line is captured by the corresponding D flip-flop. A reset line 420 can be used to reset all of the flip-flops in the obsolete cache line vector 140. Although D flip-flops are shown, there are a variety of circuits that can be used for the obsolete cache line vector, and any such circuits can be substituted for the implementation of FIG. 4.

Figure 5:
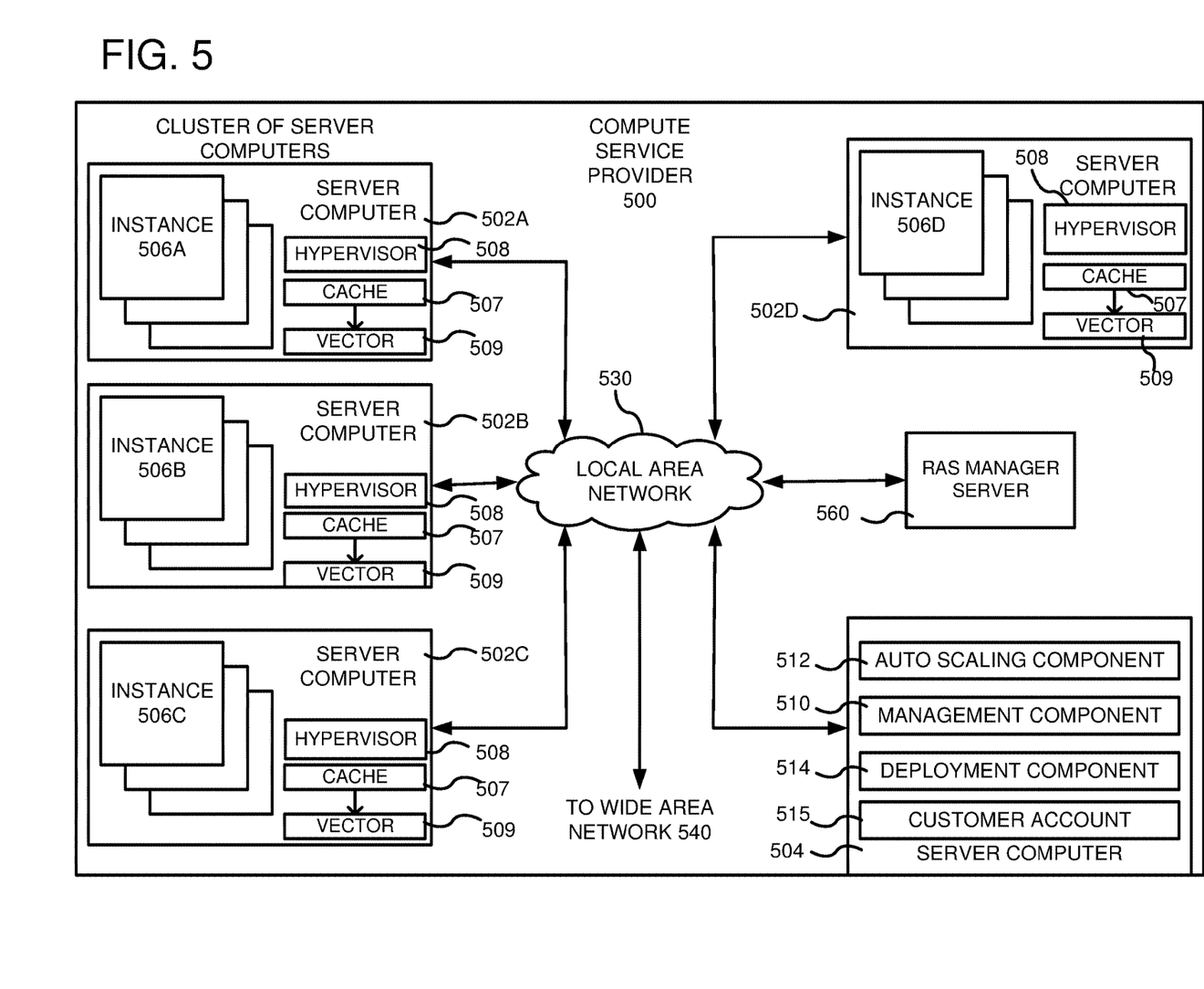
FIG. 5 shows a compute service provider environment for executing a Reliability, Availability, and Serviceability (RAS) management server for analyzing errors captured by the obsolete cache-line vectors of FIGS. 1 and 2.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e., a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications. Each of the server computers 502A-502D can include a cache 507 and an obsolete cache-line vector 509, similar to those described above.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

A RAS manager server computer 560 is coupled to the network 530 and can receive results from individual server computers relating to error location of errors in cache memory 507 on any of the servers 502A-502D, which can be obtained by the obsolete cache-line vector 509. The RAS manager server 560 can then instruct the individual cache controllers (FIG. 1 at 170) to discontinue using failing cache lines. Alternatively, the RAS manager server can instruct the individual server computers 502A-502D to migrate tenants to a different server computer. By receiving results from multiple different server computers, the RAS manager server computer 560 can perform a global analysis of cache performance in the compute service provider environment 500. Additionally, the RAS manager server 560 can perform a reset of any of the obsolete cache-line vectors or the counters. Still further, the RAS manager server 560 can adjust the error rate timers (e.g., 122) or thresholds (e.g., 132) used on the comparators.

Figure 6:
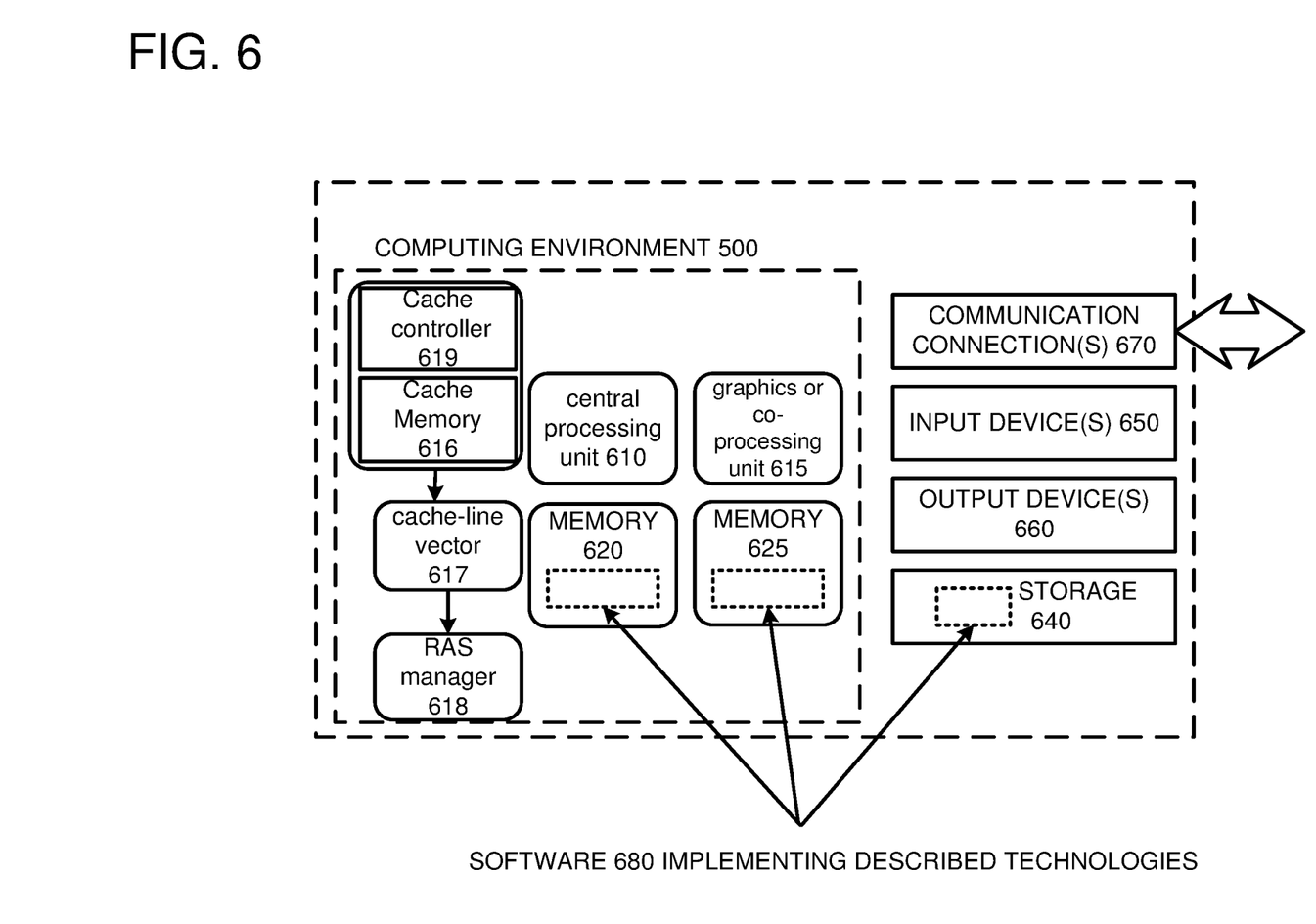
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. A cache memory 616 can be separate from the central processing unit 610 (as shown) or integrated therein. Coupled to the cache memory 616 is a cache-line vector 617, which can capture a count of cache line errors in a similar manner as described above in relation to the obsolete cache-line vector 140 of FIG. 1. A RAS manager 618 can receive an output of the cache-line vector 617 and can instruct a cache controller 619 when the cache memory 616 has too many failing cache lines to continue. Otherwise, the cache controller 619 can decide to not use cache lines that have a high frequency of errors within a predetermined time window. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 7:
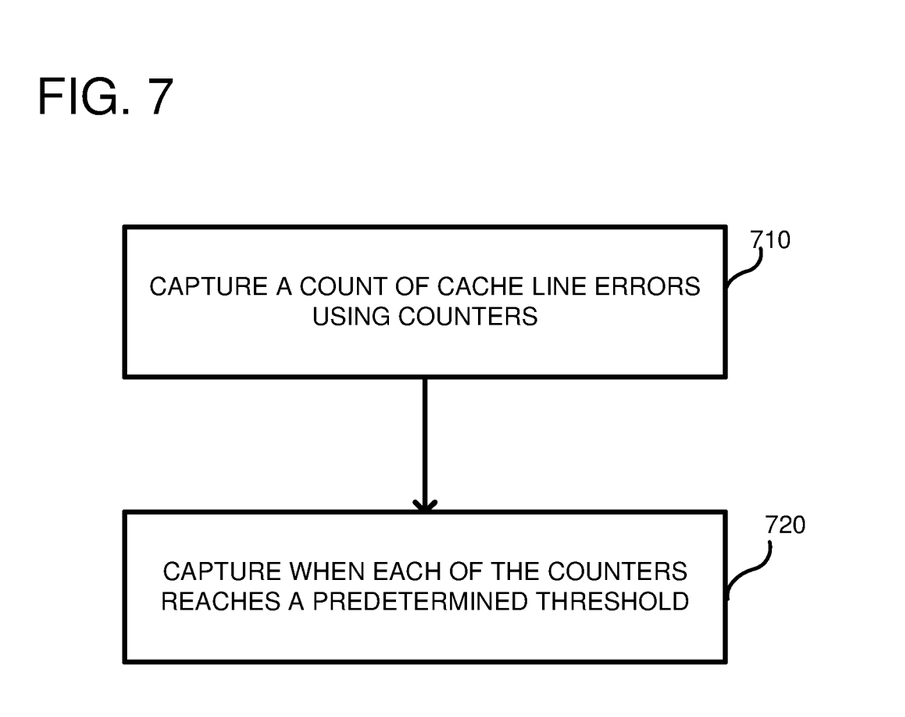
FIG. 7 is a flowchart of a method for implementing cache memory error detection.

FIG. 7 is a flowchart of a method for capturing a count of errors in a cache memory. In process block 710, a count of cache line errors is captured using counters. For example, in FIG. 1, there is a counter 120 per cache line 112 and such counters can increment upon each error detected by the error detection logic 114. More specifically, as the error detection logic 114 detects errors of cache lines 112, the error detection logic 114 generates a pulse on output 116, which increments the counter 120. In process block 720, an obsolete cache line vector can be captured when the counters reach a predetermined threshold. For example, in FIG. 1, the vector 140 can be captured when the comparators 130 are activated, indicating that a counter 120 reached a predetermined threshold 132.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system of error detection in an integrated circuit, the system comprising:
    a cache memory including a plurality of cache memory lines;
    error detection logic coupled to the cache memory, the error detection logic including a plurality of outputs, wherein each of the plurality of outputs has a one-to-one correspondence with the plurality of cache memory lines such that one of the plurality of outputs is configured to be activated when an error is detected on a corresponding cache memory line;
    a plurality of counters coupled to the plurality of outputs of the error detection logic to count a number of errors for each cache memory line, wherein the plurality of counters includes one counter per each cache memory line;
    a plurality of comparators coupled to the plurality of counters for comparing whether each of the plurality of counters reaches a threshold;
    a cache line vector coupled to the plurality of comparators, the cache line vector including a plurality of memory elements for storing whether each of the plurality of comparators has reached the threshold; and
    a cache controller coupled to the cache line vector and coupled to the cache memory lines for selectively invalidating and deactivating a cache line corresponding to one of the plurality of memory elements in the cache line vector that has reached the threshold.

2. The system of claim 1, further including a vector counter coupled to an output of the cache line vector to count how many of the memory elements store a value indicating that the threshold has been reached.

3. The system of claim 2, further including a threshold comparator coupled to the vector counter to signal the cache controller when a predetermined number of the plurality of memory elements store a value indicating that the threshold has been reached.

4. The system of claim 1, further including an error rate timer coupled to the plurality of counters to reset the plurality of counters and to establish a window of time for capturing errors.

5. The system of claim 1, wherein the cache line vector includes a plurality of flip-flops that store data indicating whether each of the plurality of comparators has reached the threshold.

6. A system, comprising:
a cache memory including a plurality of cache lines;
error detection logic coupled to the plurality of cache lines and configured to activate one of a plurality of outputs in association with an error in the plurality of cache lines;
a plurality of counters coupled to the error detection logic for counting how many errors occur with each of the plurality of cache lines, wherein the plurality of counters includes one counter for each of the plurality of cache lines; and
a cache line vector including a plurality of memory elements coupled to the plurality of counters, each of the plurality of memory elements for storing whether a corresponding one of the plurality of counters has reached a threshold amount;
a cache controller coupled to the cache line vector and coupled to the cache lines for selectively invalidating and deactivating a cache line corresponding to one of the plurality of memory elements in the cache line vector that has reached the threshold amount.

7. The system of claim 6, wherein the cache line vector includes a plurality of flip-flops coupled in parallel with outputs of the plurality of counters.

8. The system of claim 7, wherein each of the plurality of flip-flops stores a single bit that is set when the corresponding one of the plurality of counters reaches the threshold amount, and wherein the plurality of flip-flops that are set, remain set until a reset signal is received.

9. The system of claim 6, further including a plurality of comparators positioned between the plurality of counters and the cache line vector.

10. The system of claim 6, further including a vector counter coupled to the cache line vector that counts a total number of memory elements activated in the cache line vector.

11. The system of claim 10, further including a threshold comparator coupled to the vector counter for determining whether the vector counter has exceeded a threshold value and for activating a trigger in response.

12. The system of claim 11, wherein the threshold comparator has a configuration input for modifying the threshold value.

13. The system of claim 6, further including an error rate timer coupled to the plurality of counters for resetting the plurality of counters after a predetermined time window.

14. A method, comprising:
capturing a count of cache line errors detected by a cache-line error detection logic, wherein the capturing is performed by a plurality of counters, wherein each of the plurality of counters is associated with a cache line of a cache memory with one of the plurality of counters per cache line;
capturing whether each of the plurality of counters reaches a predetermined threshold level; and
selectively invalidating and deactivating a cache line in the cache memory for one of the plurality of counters that reached the predetermined threshold level.

15. The method of claim 14, wherein the capturing of whether the plurality of counters reaches the predetermined threshold is performed within a cache line vector including a plurality of memory elements, with one memory element per cache line, wherein the capturing includes setting a bit in one of the plurality of memory elements.

16. The method of claim 15, further including counting how many of the plurality of memory elements have the bit set.

17. The method of claim 14, further including resetting the plurality of counters after a predetermined time period.

18. The method of claim 14, wherein the cache-line error detection logic generates a pulse for each individual cache line that has an error, and wherein the pulse increments one of the plurality of counters.

* * * * *